(12) United States Patent
Govig et al.

(10) Patent No.: US 7,584,443 B1
(45) Date of Patent: Sep. 1, 2009

(54) CLOCK DOMAIN CONFLICT ANALYSIS FOR TIMING GRAPHS

(75) Inventors: Jason Govig, San Jose, CA (US); David Karchmer, Los Altos, CA (US); William Buckner Davis, San Jose, CA (US)

(73) Assignee: Altera Corporation, San Jose, CA (US)

( * ) Notice: Subject to any disclaimer, the term of this patent is extended or adjusted under 35 U.S.C. 154(b) by 119 days.

(21) Appl. No.: 11/683,388

(22) Filed: Mar. 7, 2007

(51) Int. Cl.
G06F 17/50 (2006.01)

(52) U.S. Cl. .............................................. 716/6; 716/1

(58) Field of Classification Search ............... 716/1, 716/6
See application file for complete search history.

(56) References Cited

U.S. PATENT DOCUMENTS

| | | | |
|---|---|---|---|
| 5,777,500 A * | 7/1998 | Eitrheim | 327/174 |
| 6,106,568 A * | 8/2000 | Beausang et al. | 716/18 |
| 6,131,173 A * | 10/2000 | Meirlevede et al. | 714/726 |
| 6,345,328 B1 * | 2/2002 | Rozario et al. | 710/52 |
| 7,051,312 B1 * | 5/2006 | Rahut et al. | 716/13 |
| 7,093,219 B1 | 8/2006 | Hutton | |
| 7,178,124 B1 * | 2/2007 | Makarov et al. | 716/12 |
| 2005/0132316 A1 * | 6/2005 | Suaris et al. | 716/11 |
| 2005/0166104 A1 * | 7/2005 | Rich et al. | 714/724 |
| 2008/0216038 A1 * | 9/2008 | Bose | 716/8 |

OTHER PUBLICATIONS

Mike Hutton, David Karchmer, Bryan Archell, and Jason Govig, Efficient Static Timing Analysis And Applications Using Edge Masks, Altera Corporation, San Jose, 10 pages.

Shuo Zhou, Bo Yao, Hongyu Chen, Yi Zhu, Chung-Kuan Cheng, Mike Hutton, Truman Collins, Sridhar Srinivasan, Nanchi Chou and Peter Suaris, Improving the Efficiency of Static Timing Analysis with False Paths, 5 pages.

Shuo Zhou, Bo Yao, Hongyu Chen, Yi Zhu, Chung-Kuan Cheng, and Mike Hutton, Efficient Static Timing Analysis Using a Unified Framework for False Paths and Multi-Cycle Paths, 6 pages.

Shou Zhou, Yi Zhu, Yuanfang Hu, Chung-Kuan Cheng, Ronald Graham, and Mike Hutton, Timing Model Reduction for Hierarchical Timing Analysis, Altera Corporation, 21pages.

(Continued)

*Primary Examiner*—Jack Chiang
*Assistant Examiner*—Suchin Parihar
(74) *Attorney, Agent, or Firm*—Martine Penilla & Gencarella, LLP (57) ABSTRACT

The present invention is directed to clock domain conflict analysis of a timing graph that features, dissociating clock domains of one or more of a path having conflicting clock domains while preserving the original clock domain relationship of the edges in the path. To that end, the method includes generating a timing graph having a source instance, a destination instance and a plurality of edges defining a plurality of signal paths between the source instance and the destination instance. A plurality of clock domains is corresponded to the timing graph, with a subset of the plurality of edges being associated with more than one clock domain. From the subset, conflicting clock domains associated with a common edge are identified. In response to identification of the conflict, one of the clock domains is dissociated from one of the edges of the subset.

27 Claims, 7 Drawing Sheets

OTHER PUBLICATIONS

Shou Zhou, Bo Yao, Hongyu Chen, Yi Zhu, Chung-Kuan Cheng and Mike Hutton, An Integrated Solution Dealing with False Paths and Multi-Cycle Paths in Static Timing Analysis, 22 pages.

Haizhou Chen, Bing Lu, and DIng-Zhu Du, Static Timing Analysis with False Paths, 4 pages.

Eugene Goldberg, Alexander Saldanha, Timing Analysis with Implicitly Specified False Paths, 5 pages.

Krishna P. Belkhale, and Alexandeer J. Suess, Timing Analysis with known False Sub Graphs, 5 pages.

David Blaauw, Rajendran Panda, and Abhijit Das, Removing user-specified false paths form timing graphs, 4 pages.

* cited by examiner

CLOCK DOMAIN CONFLICT ANALYSIS FOR TIMING GRAPHS

BACKGROUND

The present invention relates to techniques for performing timing analysis of an integrated circuit design. More particularly, the present invention is suitable for performing timing analysis in further of establishing a layout of an integrated circuit.

Establishing a layout of an integrated circuit is typically achieved employing a placement tool. A placement tool is a software tool that facilitates locating circuit elements of an integrated circuit according to design parameters. One class of integrated circuit includes programmable circuit elements, referred to as logic blocks or logic elements, which may be programmed to implement desired logic functions. These are typically referred to as programmable integrated circuits. Examples of programmable integrated circuits include field programmable gate arrays (FPGAs), programmable logic devices (PLDs), programmable logic arrays (PLAs), configurable logic arrays and mask-programmable logic devices. Programmable integrated circuits can also contain hardwired circuit blocks that are not programmable. During placement, circuit elements are assigned to physical logic elements, and other circuit elements are associated with the integrated circuit. This is referred to as programming of the integrated circuit.

Programming of the integrated circuit is done according to the design parameters, which are expressed as a network of abstract logic elements. The abstract logic elements are mapped onto the physical logic elements of the integrated circuit. In this manner, the physical logic elements of the integrated circuit are associated with the logic functions of the abstract logic elements. The conversion process is referred to as synthesis. During synthesis, a routing process is employed to place the differing logic elements in electrical communication.

Typically, the design parameters include timing requirements that define various characteristics of signal propagation between the logic elements of the integrated circuit. Exemplary timing requirements include source and destination points for the signal and the maximum allowable source-to-destination delays for signal propagation. Additional constraints included in the design parameters, in addition to the timing requirements, may be present. For example, minimum allowable clock speeds for various logic elements may be defined.

Relative placement of the logic elements in a physical layout of the integrated circuit determines, in part, the signal propagation time between the source and the destination. As a result, it is desired to analyze the propagation time of signals in a particular design once the logic elements have been mapped to a physical layout. This is referred to as timing analysis. Timing analysis facilitates identifying maximum delay paths between selected sources and destinations for a give design, relative to constraint.

To that end, a timing graph is generated that includes nodes connect by edges. The nodes represent logic elements, and the edges represent electrical connection between the logic elements. Determined are slack and relative slack/slack ratio values, commonly referred to as slack values, for certain paths between selected sources and destinations. The slack values facilitate determining the location of logic elements in a physical layout of the design. Specifically, edges of the timing graph may be associated with the slack values. In this manner, the timing delay among a sequence of edges that define a path between a source and a destination may be calculated. Were the timing delay along the path to exceed the timing requirements of the design, the physical location of the logic elements associated with the design change to improve, or reduce, the timing delay.

Two basic techniques to undertake timing analysis includes breadth-first search (BFS) or depth-first search (DFS). BFS is more advantageous, compared to DFS, for minimizing the additional work required to visit nodes which are not relevant to a computation. A drawback with BFS, however, is that the same is memory intensive, requiring more memory than DFS. Although recursive DFS may ameliorate the memory required for the timing analysis, typically BFS requires a larger region of the netlist to be examined than DFS, resulting is relatively more computationally expensive technique than DFS.

An important task when performing timing analysis is determining how many traversals of the timing graph is required to process each timing requirement. For example, each timing requirement may result in multiple traversals of the timing graph due to other higher-priority timing requirements being associated with all or part of a path. As a result, two conflicting timing requirements may correspond to all or part of the edges placing a given source in signal communication with a given destination, referred to as a conflict. Prior art attempts to address timing graph conflicts involve expanding timing requirements into source-to-destination assignments and identify common sources or destinations for differing timing requirements to allow merging the source-to-destination assignments by looking for common sources or destinations. This approach has proved to time consuming and memory intensive. Furthermore, grouping timing requirements having common sources of destinations provides little information about the tining requirements associated therewith.

There is a need, therefore, of overcoming timing graph conflicts while avoiding the time consuming, memory intensive analysis of the prior art.

SUMMARY

It should be appreciated that the present invention can be implemented in numerous ways, such as a process, an apparatus, a system, a device or a method embodied on a computer readable medium as computer-readable instructions. Several inventive embodiments of the present invention are described below.

The present invention is directed to a method of clock domain conflict analysis of a timing graph that features, dissociating clock domains from one or more of edges in a path having conflicting clock domains while preserving the original clock domain relationship of the edges. To that end, the method includes generating a timing graph having a source instance, a destination instance and a plurality of edges defining a plurality of signal paths between the source and destination. A plurality of clock-domains is corresponded to the timing graph, with a subset of the plurality of edges being associated with more than one clock domain. From the subset, conflicting clock domains associated with a common edge are identified. In response to identification of the conflict, one of the clock domains is dissociated from one of the edges of the subset. Also included are a system and a computer-readable medium adapted to facilitate a general processing computer to carry-out the functions of the method. These and other aspects of the invention will become apparent from the following detailed description, taken in conjunction with the accompanying drawings, illustrating by way of example the principles of the invention.

DETAILED DESCRIPTION OF THE INVENTION

Figure 1:
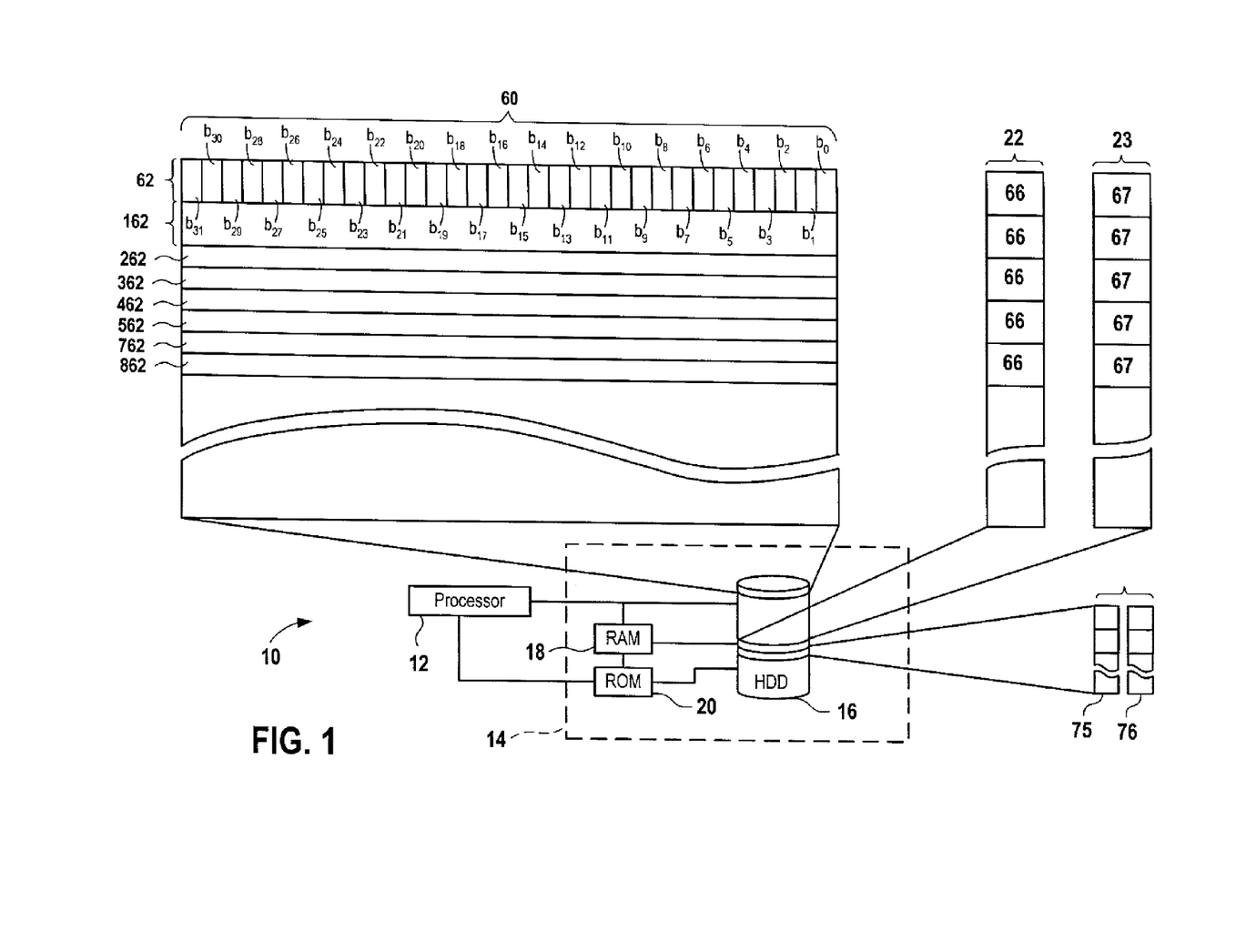
FIG. 1 is an illustration of a processor system in accordance with one embodiment of the present invention.

Referring to FIG. 1, the present invention may be implemented in a computer system 10 that includes a processor 12 in data communication with a memory space 14 that may include a hard disk drive HDD 16, and volatile memory components, such as random access memory 18, read only memory 20. Included on HDD 16 is information concerning the design parameters, such as signal propagation criteria that includes circuit elements between which a signal is to propagate and the timing requirements that must be satisfied by the signal propagation. The information concerning the design parameters is written in computer-readable language, referred to as hardware description language HDL. From the signal propagation criteria, a netlist 22 is generated that includes information that describes the connectivity of the design of an integrated circuit (not shown). The netlist 22 includes descriptions of the elements of the design, such as logic blocks. Examples of logic blocks include AND gates, OR gates, NAND gates, NOR gates, FLIP-FLOPs, REGISTERS and the like, which are referred to as instances of the design. Netlist 22 also includes definitions for each instance, as well as connections that can be made to and between the elements, referred to as edges, and timing delays associated with signal propagation over edges and instances.

The present invention is directed to identifying paths between instances over which a signal may propagate while satisfying timing requirements of the design. For example, one timing requirement may define a maximum delay that a signal may demonstrate propagating from a source instance to a destination instance. Another example of a timing requirement is the minimum delay that a signal my demonstrate propagating from a source instance to a destination instance. To facilitate identifying these paths, the design typically includes information concerning timing requirements. The information is shown as an exceptions_list 23 that includes sets of timing exceptions 67. Each set of timing exceptions 67 of exceptions_list 23 corresponds to a set of timing exceptions that differs from the remaining sets of timing exceptions corresponding to the remaining entries 67 of exceptions_list 23. It should be understood that a set of timing exceptions may consist of a single timing exception or multiple timing exceptions. The timing exceptions are the measure by which to determine the appropriate connectivity between the instances to ensure the timing requirements of the design parameters are satisfied.

Figure 2:
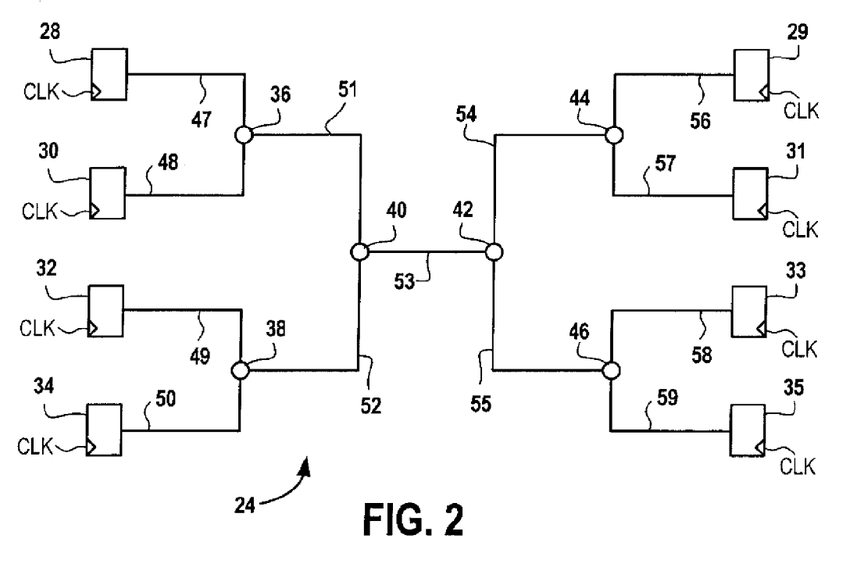
FIG. 2 is a schematic view of a timing graph in accordance with the present invention.

Referring to both FIGS. 1 and 2, to determine the appropriate connectivity between the instances timing analysis is undertaken that includes generating a timing graph 24 based upon the information in netlist 22 and determining the paths over which signals may propagate and satisfy the timing requirements of the design. For example, timing graph 24 includes a plurality of instances 28-35, 36, 38, 40, 42, 44 and 46 of elements of netlist 22, as well as edges 47-59. Edges 47-59 represent conductors, such as wires. Instances 28, 30, 32 and 34 represent source elements from which a signal will be generated and are referred to as source instances. Instances 29, 31, 33 and 35 represent destination elements to which a signal will propagate from one or more of source instances 28, 30, 32 and 34. Instances 36, 38, 40, 42, 44 and 46 represent other circuit elements of a design that are neither a source instance nor a destination instance and are referred to as node instances. Timing graph 24 represents a portion of the design parameters of the integrated circuit (not shown). As can be seen, multiple paths exist along which a signal may propagate between source and destination instances. During timing analysis, each of the timing exceptions 67 of exceptions_list 23 are analyzed to identify edges and instances through which a signal may propagate while satisfying the timing requirements defined by the timing exceptions 67.

One example of a timing exception for signal propagation is referred to as maximum delay signal propagation. An example of a maximum delay signal propagation timing exception between source instance 28 and destination instance 35 may be defined as follows:

$$\text{set\_max\_delay\_path-from}\{28\}\text{-to }\{35\}=40 \text{ ns} \quad (1)$$

This assignment requires that a signal propagating between source instance 28 to destination instance 35 take no more than 40 nanoseconds. Based upon timing graph 24, the signal would propagate through each of node instances 36, 40, 42 and 46 providing a path over which signal propagating would occur defined by edges 47, 51, 53, 55 and 59, as well as node instances 36, 40, 42 and 46. Therefore, timing exception (1) defines a clock domain CD, that consists of edges 47, 51, 53, 55, 59 and source instance 28 destination instance 35 as well as node instances 36, 40, 42, 46. Specifically, a clock domain is defined as a path of edges and instances between a source instance and a destination instance and satisfies the timing exception of the design parameters under analysis. In practice, multiple paths may be available over which a signal may propagate between source instance 28 and destination instance 35. As a result, but not shown in the present timing graph 24, it is conceivable a timing graph may define one or more paths between a source instance and a destination instance that is not covered by the timing exception under analysis. The edges and instances of that path would not being included in the clock domain for the timing exception under analysis.

The relationship between edges and timing exceptions 67 of exceptions_list 23 are derived from a masking table 60. Masking table 60 includes a plurality of edge labels 62, 162, 262, 362, 462, 562, 662, 762 and 862, each of which points to one or more the entries 67 of exceptions_list 23 corresponding to edges 47-59 of graph 24. Each edge mask 62 includes multiple bits $b_0$-$b_{31}$. Although any number of bits may be included in each edge mask 62, in the present example, each edge mask 62 includes thirty-two bits $b_0$-$b_{31}$. Each bit $b_0$-$b_{31}$ may correspond to a timing exception 67 in exceptions_list 23 by having a logical "1" value at which time the bit $b_0$-$b_{31}$ is referred to as a mask. Otherwise, the bit $b_0$-$b_{31}$ has a logical "0" value and does not point to an entry 67 of exceptions_list 23. Each timing exception 67 of exceptions_list 23 corresponds to a set of entries 66 of netlist 22 relating instances 28-35 to the timing exception 67. The edges corresponding to the instances identified by entries 67 are obtained from the relational information between instances 28-35, 36, 38, 40, 42, 44 and edges 47-59 contained in netlist 22. In this manner, the masking table 60 associates timing exceptions to edges 47-59 by which to determine the appropriate paths of graph 24 over which a signal may propagate between source instances 28, 30, 32, 34 and destination instances 29, 31, 33 and 35 for a given constraint as defined by the timing exception.

Figure 3:
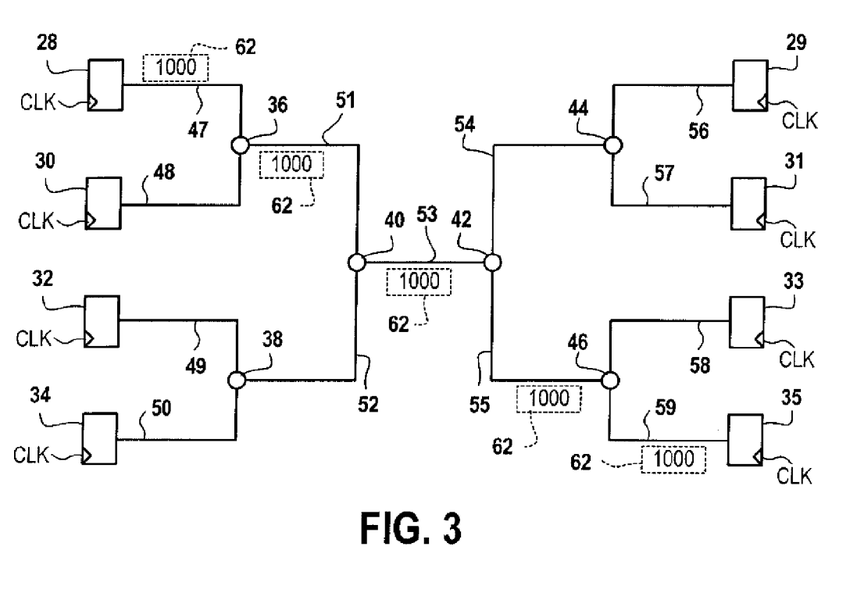
FIG. 3 is a schematic view of the timing graph shown in FIG. 2 with a first clock domain mapped thereto in accordance with the present invention.

An example of a mapping of CD, to timing graph 24 is shown in FIG. 3. As shown, edges 47, 51, 53, 55 and 59 are associated with edge label 62. Bits $b_0$-$b_{31}$ of edge label 62 have the following values: $b_3$ has a logical "1", and $b_0$ has a logical "0", $b_1$ has a logical "0" and $b_2$ has a logical "0", as do all the bits greater than $b_3$. As a result, edge label 62 is shown as including only bits $b_0$-$b_3$ for convenience, with the understanding that edge label 62 includes all bits $b_0$-$b_{31}$. Any edge that does not have an edge label shown in the figure is understood to be assigned a value of 0 for all bits $b_0$-$b_{31}$ included in the edge label corresponding to the edge.

To identify an appropriate path for signal propagation, a pair of DFS graph traversals are undertaken to identify the appropriate edges for the timing exception under analysis by generating two temporary mappings of timing graph 24, referred to as a source mapping and a destination mapping. By temporary meant is that the data of the two mappings are stored in a less permanent portion of memory space 14 that HDD 16, e.g., RAM 18. The path affected by a timing exception, such as that of FIG. 3, is obtained by combining the source and destination mappings across appropriate edges 47-59, by way of a bitwise AND operation on the data associated with each edge label of the source and destination mappings. An example of a bitwise AND operation is described in U.S. Pat. No. 7,093,219 to van Antwerpen et al., which is assigned to assignee of the instant invention and is incorporated by reference herein in its entirety. The result is a mapping, to timing graph 24, of a clock domain defined by the timing exception under analysis. The details of this process are described below.

Figure 4:
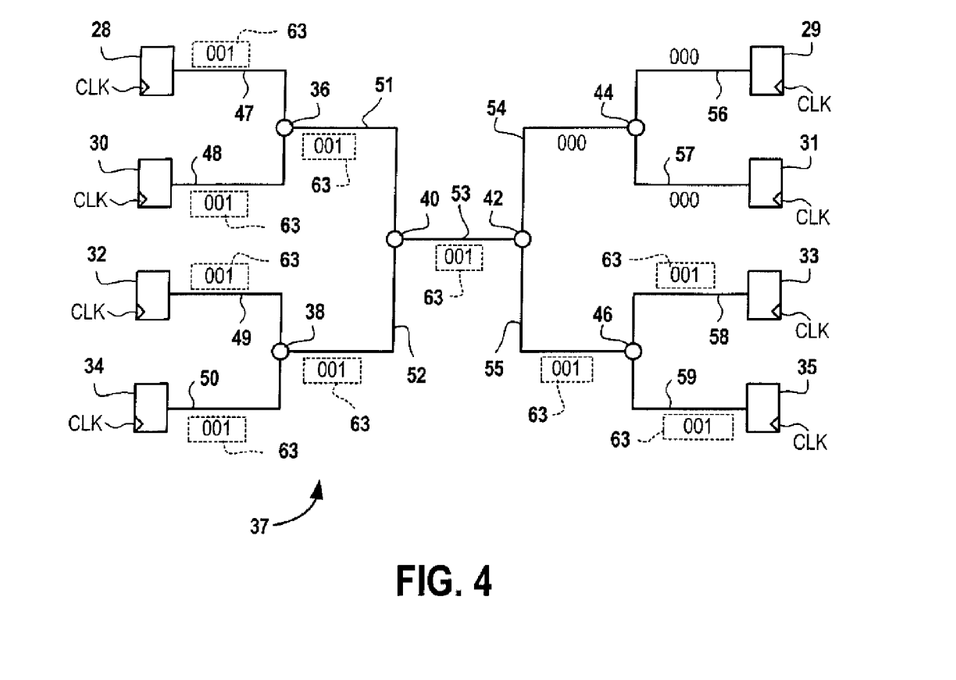
FIG. 4 is a schematic view of a destination mapping of the timing graph shown in FIG. 2 having edge masks assigning a timing exception to edges thereof in accordance with the present invention.

Referring to both FIGS. 2 and 4, assume being determined are edges of timing graph 24 to generate a destination mapping for the following timing exception:

$$\text{set\_multicycle\_path-from } \{28,32\}\text{-to } \{33,35\}=2 \quad (3)$$

Propagation routing to generate destination mapping 37 performs a DFS propagation traversal of timing graph 24 initiated at the destination instances along paths defined as follows:

$$\text{set\_multicycle\_path-from*-to } \{33,35\}=2 \quad (4)$$

where * represents the entire set of source instances; in this example {28, 30, 32, 34}. This results in a mask $b_0$ being associated with edges 47, 48, 49, 50, 51, 52, 53, 55, 58 and 59 by virtue of the data associated with edge label 63 corresponding to 47, 48, 49, 50, 51, 52, 53, 55, 58 and 59. Bits $b_0$-$b_{31}$ of edge label 63 have the following values: $b_0$ has a logical "1", $b_1$ has a logical "0" and $b_2$ has a logical "0", as do all the bits greater than $b_2$. As a result, edge label 63 is shown as including only bits $b_0$-$b_2$ for convenience, with the understanding that edge label 63 includes bits $b_0$-$b_{31}$. In the present example, mask $b_0$ is propagated along edges 53, 52, 51, 50, 49, 48 and 47 from destination instances 35 and 33 toward source instance 28, 30, 32 and 34. Implementing propagation routing so as to commence with destination instances reduces the computational resources required to correspond edge labels to edges 47-59 and hence associate timing requirements therewith. There is no need to correspond edge masks to edges 54, 56 and 57, because these edges lead only to destination instances 29 and 31, and not destination instances 33 and 35 as identified by the destination timing exception (4).

Figure 5:
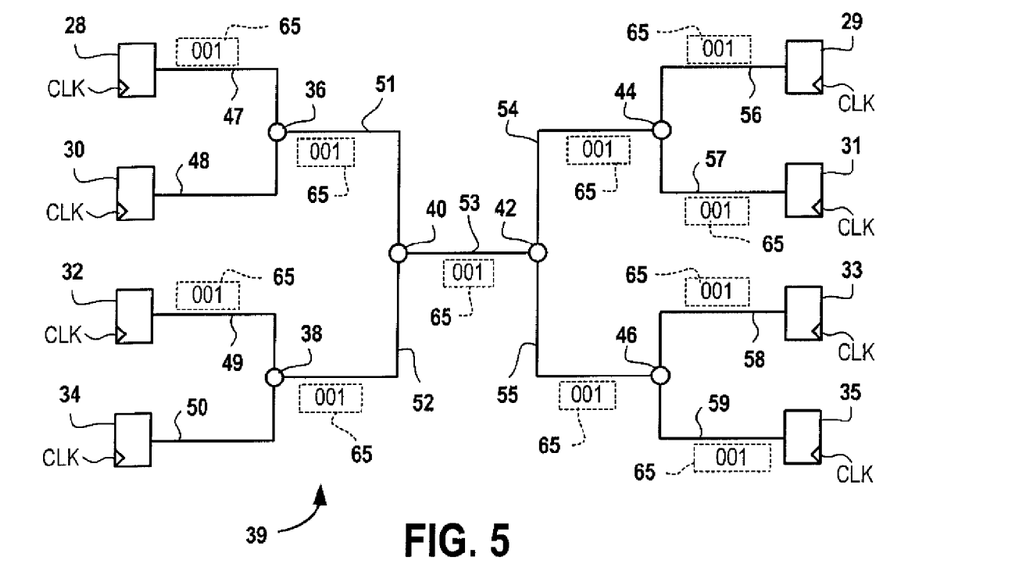
FIG. 5 is a schematic view of a source mapping of the timing graph shown in FIG. 2 having edge masks assigning the timing exception discussed in FIG. 4 to edges thereof in accordance with one embodiment of the present invention.

Referring to FIGS. 2, 4 and 5, after generating destination mapping 37, a source mapping 39 is generated by undertaking propagation routing for timing exception (3) so as to, commence from source instances 28 and 32. To that end, propagation routing for the source mapping would perform a DFS propagation initiated at source instances 28, 30, 32 and 34 along paths defined as follows:

$$\text{set\_multicycle\_path-from } \{28,32\}\text{-to*}=2 \quad (5)$$

where * represents the entire set of destination instances; in this example {29, 31, 33, 35}. The source mapping that results from the propagation routing includes edge label 65 corresponding mask $b_0$ to edges 47-53, 55, 58 and 59 by virtue of associated mask label 65 thereto. Edge labels 63 and 65 contain the same mask $b_0$, because edge labels 63 and 65 represent a single common timing exception 67 and, hence, a single common timing requirement.

Referring to both FIGS. 1, 4, 5 and 6, after generating both the source mapping 39 and destination mapping 37 for timing graph 24, a clock domain defined by one of timing exceptions 67 is mapped to timing graph 24 to generate an intersection graph 74. This is achieved by performing a bitwise AND operation on data edge labels corresponding to edges included in both the destination mapping 37 and the source mapping 39. To demonstrate this process the data for edge 47 is taken from a temporary source mapping edge label 65 and a temporary destination mapping edge label 63 to produce an edge label 162 for edge 47 by way of a bitwise AND operation. Alternatively, when obtaining the data value for edge 48, each bit of edge label 65, corresponding thereto, may be set to a logical "0" while the data of edge label 63 associated with edge 48 is maintained. The bitwise AND of the data of edge labels 63 and 65, is 000 and 001 respectively. As a result, no timing exception corresponds to edge 48, because there is no mask defined by the edge label considering the value of each bit being a logical "0". Mask $b_0$ corresponds to edges 47-59 included in the clock domain defined by timing exception (3) indicated by the presence of a logical "1" in bit address $b_0$ of edge label 162 In the present example this mask $b_0$ corresponds to edges 47, 49, 51, 52, 53, 55, 58 and 59. For a thirty-two bit mask, there may be as many as thirty-two clock domains associated with edges 47-59, with the understanding that the number of bits used to represent clock domains can be unbounded. It should also be appreciated that, for a thirty-two bit mask, up to thirty-two initial clock domains (from thirty-two exceptions) can be processed simultaneously.

Referring again to FIGS. 1, 2, 4 and 5, in a first alternate embodiment, of the present invention, a pair of refined_lists 75 and 76 may be maintained for each timing exception each of which corresponding to the source instances or destination instances verified as affected by the timing exception. The refined_lists are maintained to assist in the reduction of source or destination instances that are checked during a process to determine whether a timing conflict is present. A timing conflict is defined as two differing clock domains being associated with both a common source instance and a common destination instance. The source instance refined_list 74, for example, can be created during the creation of the source mapping timing graph, such as source mapping 39. Before corresponding a mask on the initial edge of a source instance, destination mapping 37 is checked to determine if the given source instance was reached during the destination mapping DFS propagation. If no corresponding mask is found, the source instance does not need to be included in any additional processing of the timing exception under consideration. Alternatively if a corresponding mask is found, the node source instance recorded in a refined_list as a valid source instance. Destination instances can similarly be added to the destination refined_list 76 during the source mapping DFS propagation when a destination instance is reached by the source DFS propagation. The refined_lists 75 and 76 contain a strict subset of source or destination instances of the original instance collections.

In a second alternate embodiment of the present invention, it is possible to propagate multiple timing exception masks during a propagation pass. This is possible by marking the initial edge of all nodes (fan-out of source instances and fan-in of destination instances) for all assignments. The masks are then propagated for the source instance and destination instance in the method described previously with multiple masks being propagated instead of a single mask. Propagation can stop when an edge containing a superset of the mask bits being propagated is encountered, or a predefined destination instance is reached.

Following generation of clock domains, potential timing conflicts among the timing exceptions are identified. Computationally speaking, the bitwise AND of all edges comprising a path having any number of bits greater than one contains a timing conflict. A potential timing conflict is defined as the likelihood of a conflict between a pair of timing exceptions to exist without spending the resources necessary to verify the completeness of the conflict. Potential conflicts are discovered during the addition of a new timing exception by checking the edges immediately associated with the source instances and destination instances. Any masks corresponding to both a source instance edge and a destination instance edge that also corresponds to an additional mask associated with a new timing exception that differs from the timing exception identified by the existing mask satisfies the requirements for a potential timing conflict.

Figure 6:
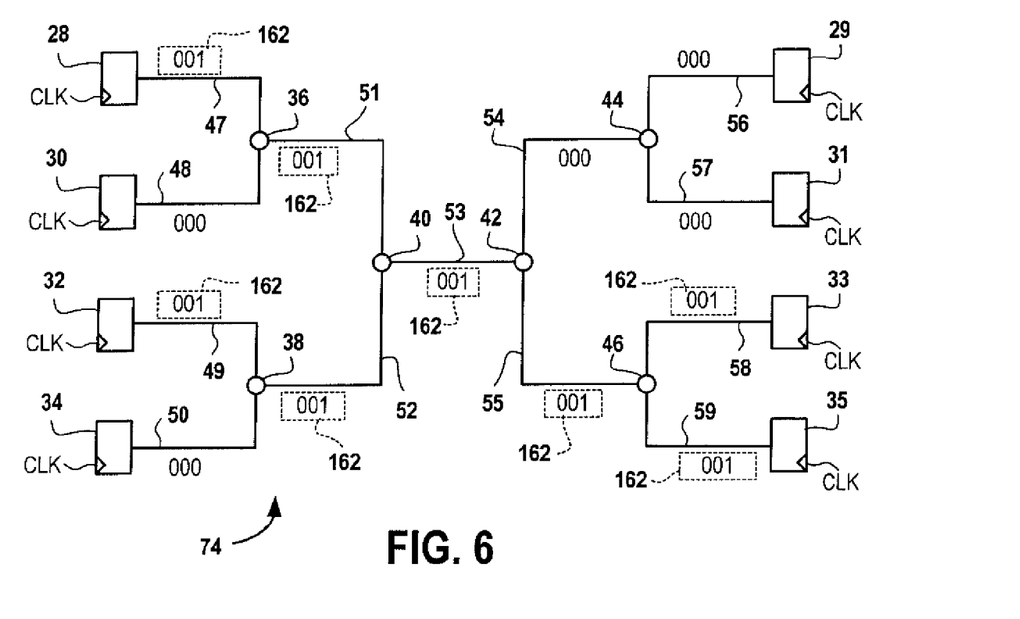
FIG. 6 is a schematic view of an intersection graph having a third clock domain mapped thereto derived from the destination mapping shown in FIG. 4 and the source mapping shown in FIG. 5 in accordance with the present invention.
Figure 7:
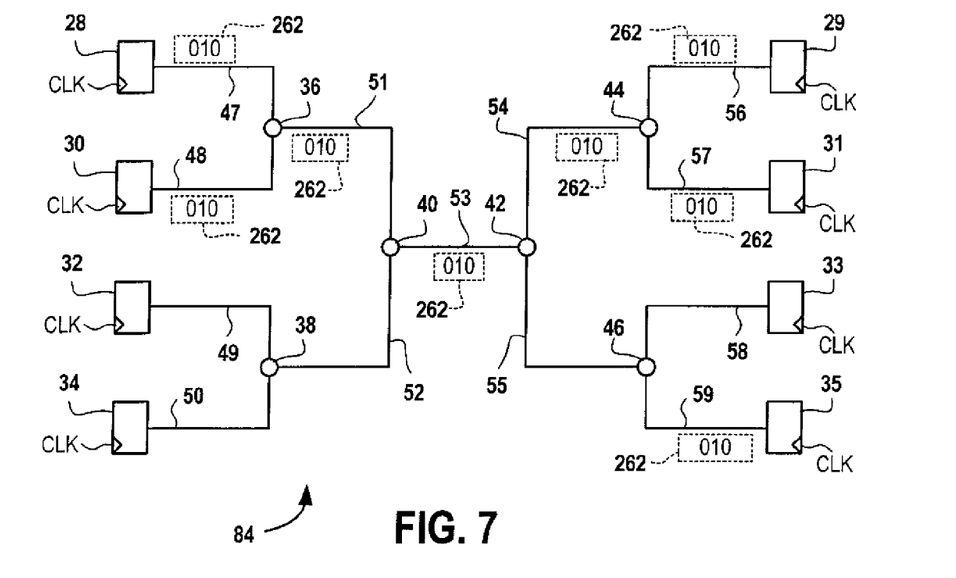
FIG. 7 is a schematic view of the timing graph shown in FIG. 6 having a fourth clock domain mapped thereto, in accordance with the present invention.
Figure 8:
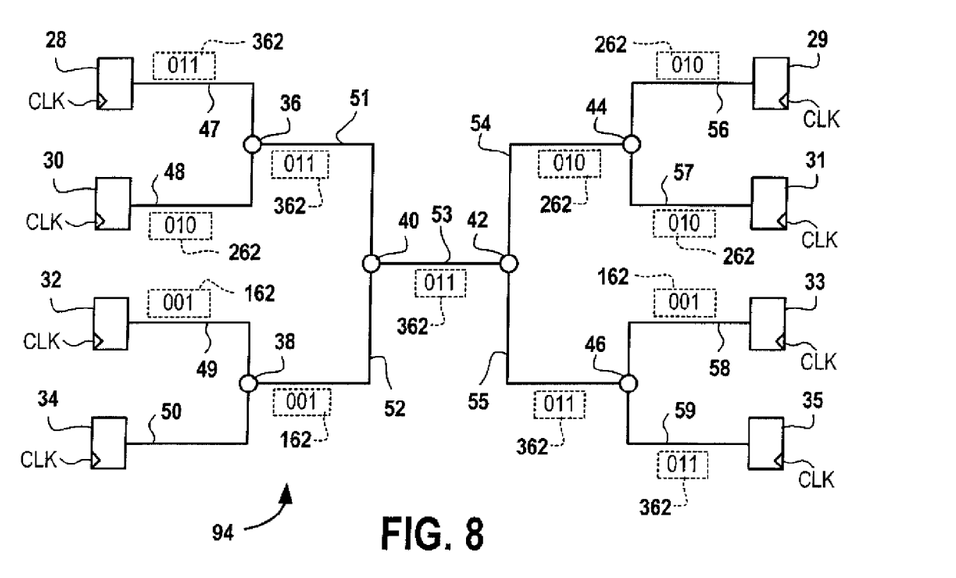
FIG. 8 is a schematic view demonstrating the combination of the timing graph shown in FIG. 6 with that of the timing graph shown in FIG. 7 demonstrating conflict masks corresponding to a sub-group of the edges thereof resulting from the multiple clock domains mapped thereto.

Referring to FIGS. 6-8 assume that an mask $b_1$ corresponds to the following timing exception:

$$\text{set\_multicycle\_path-from } \{28,30\}\text{-to } \{29,31,35\}=3 \quad (6)$$

resulting in edge label 262 being propagated over edge to establish a clock domain as indicated by timing graph mapping 84. Timing graph mapping 84 is combined with timing graph mapping 74 to produce conflict mapping 94 by performing a bitwise OR on all data associated with edges of the graph. Conflict mapping 94 contains the result of this operation and introduces edge label 362 which represents the edges that are shared by edge labels 162 and 262 with the understanding that these edges remain a part of the masks $b_0$ and $b_1$.

With masks $b_0$ and $b_1$ in place corresponding to timing exceptions (3) and (6) respectively the existence of potential timing conflicts are identified. Potential conflicts are found by checking the edges immediately extending from the source and destination instances corresponding to the high priority constraint domain (HPC), timing exception (6) in this example, and looking for edges corresponding to both of mask $b_0$ and of mask $b_1$. Edges 47 and 48 extending from source instances 28 and 30 are checked using a bitwise AND for the presence of edge label 362, i.e., edge label 362 that is equivalent to the bitwise OR of the data of edge labels 162 and 262.

Referring to FIG. 8, source instance edge 47 satisfies this requirement of masks $b_0$ and $b_1$. With a source conflict identified for timing exceptions (3) and (6) on masks $b_0$ and $b_1$, analyzed are the destination instance edges of timing exception (6) to complete the potential conflict requirements. Edges 56, 57, and 59 corresponding to destination instances 29, 31 and 35 respectively are checked for the existence of edge label 362. A potential conflict is identified by the AND of the source conflict mask and the destination conflict mask. The result is a mask representing all lower-priority clock domains with the HPC. Destination instance edge 59 is marked with edge label 362 and fulfills the requirements for a potential conflict between source instance 28 and destination instance 35 for timing exceptions (6) and (3), corresponding edges 47 and 59 to two mask $b_0$ and $b_1$ and, therefore, two different sets of timing exceptions. It should be appreciated that, for a thirty-two bit mask, that up to thirty-one lower-priority conflict domains can be identified simultaneously for a given HPC.

To resolve the potential conflict, the lower priority domain conflict (LPC) path from source instance 28 to destination instance 35 is be removed in favor of the HPC on the same path. This overwriting must preserve the LPC paths that do not conflict, namely from source instance 28 to destination instance 33 and separately from source instance 30 to destination instances 33 and 35; both of which correspond to timing exception (3) and are not overwritten by timing exception (6). In order to preserve the LPC paths, the timing exception corresponding to the LPC is duplicated using a restricted propagation technique referred to as the conflict area of effect (CAOE). In the present example, the timing exception represented by mask $b_0$ has a lower priority than the timing exception represented by mask $b_1$ and is the LPC that will undergo CAOE duplication.

Figure 9:
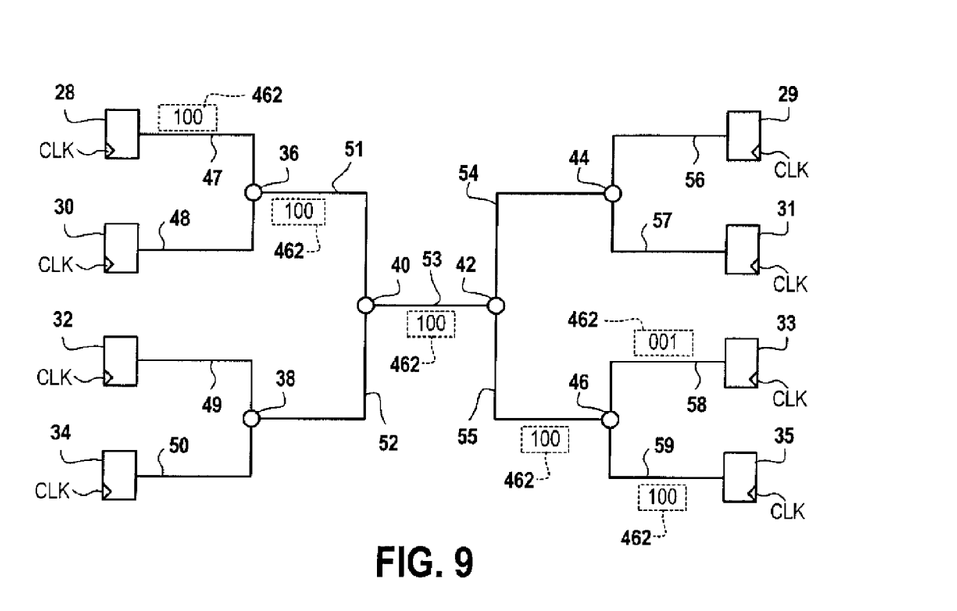
FIG. 9 is a schematic view of a conflict area of effect mapping relating to the timing graph shown in FIG. 8 on a restricted path constrained by the timing graph in FIG. 6.

Referring to both FIGS. 8 and 9, in the present example, bit $b_2$ points to a duplicate of timing exception (3) and is, therefore, referred to as a duplicate mask, i.e., both mask $b_0$ and duplicate mask $b_2$ are associated with a common timing exception, which may be a common entry 67 or two different entries 67 associated with the same timing exception. Duplication propagation proceeds from the identified source instances for the potential conflict on the edges where bits $b_0$ and $b_1$ are both set to '1' (edge 47 in the present example). These initial edges restrict our propagation to only the graph area affected by the conflict, thus avoiding a complete duplication of mask $b_0$. Propagation of edge label 462 then continues toward destination instances only on edges that are also marked with mask be (found in FIG. 8); these edges 51, 53, 55, 58, and 59 guide the propagation only on edges that are in the original mask.

Figure 10:
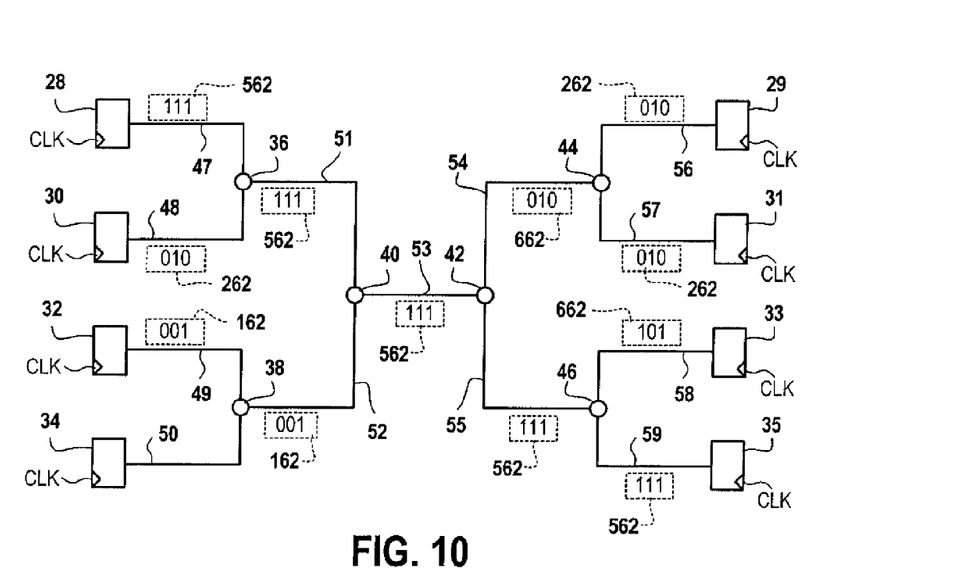
FIG. 10 is a schematic view demonstrating the combination of the timing graph shown in FIG. 8 with that of the timing graph shown in FIG. 9 further depicting the mask utilization in the conflict resolution.

With the CAOE mask constructed, the masks from FIG. 8 and FIG. 9 are combined using a bitwise OR to result in the edge labels 562 shown in FIG. 10. The final step in the conflict resolution process is to remove the LPC and CAOE masks from the conflict endpoints to leave the source and destination instances that are uniquely related by a single timing exception.

Endpoint mask removal begins by removing the LPC mask $b_0$ from the source instances involved in the conflict, here the initial edges corresponding to source instance 28 are examined for the existence of masks $b_0$, $b_1$, and $b_2$, respectively. For this edge, 47, the bit in position $b_0$ is set to '0'. With this removal, the path of mask $b_0$ from source instance 28 has been severed, i.e., does not extend between source and destination instances. In this instance mask $b_0$ is referred to as a dangling mask. In FIG. 10 edge 51 is corresponds to mask $b_0$, but does not continue on to reach any source instances by way of edges 47 or 48. The removal process then continues to edge 51 to check for dangling masks. Prior to the removal of mask $b_0$ from edge 51, the fan-in edges of node instance 36 are examined for the existence of mask $b_0$. If mask $b_0$ is found on any fan-in edge of node instance 36, it is known that a path exists for mask $b_0$ through node 36 separate from the path of the dangling mask removal. In the current example no such fan-in are found on node instance 36 that correspond to mask $b_0$ so mask $b_0$ is removed from edge 51 and the dangling mask removal continues recursively. The next edge that is processed is edge 53, however here when the fan-in of node 40 is checked for the existence of mask $b_0$ it is found on edge 52. This discovery indicates that another path uses mask $b_0$ on edge 53 by way of edge 52 and the dangling mask removal is complete.

Figure 11:
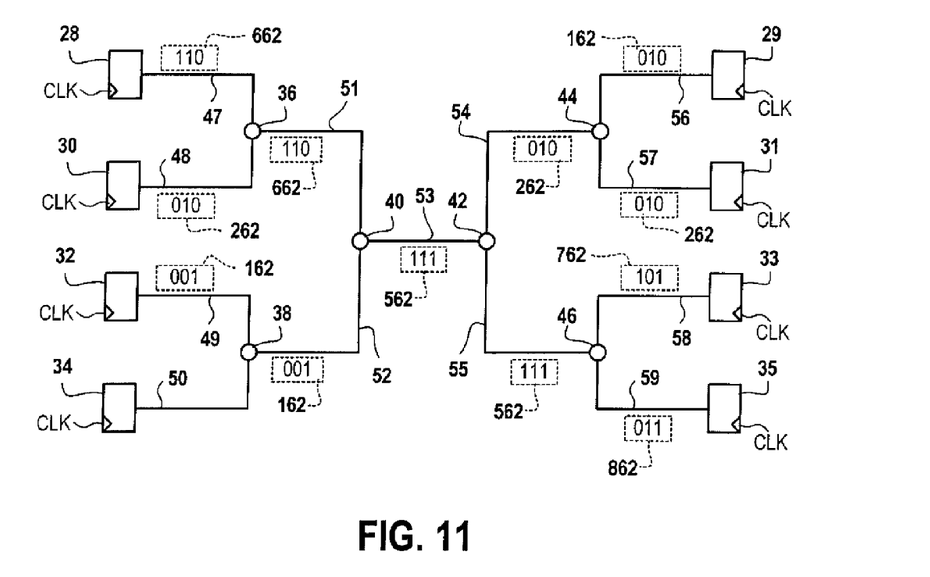
FIG. 11 is a schematic view of the timing graph shown in FIG. 9 having diminished edge masks corresponding to edges thereof so as to represent only one time domain in accordance with the present invention.

Referring to both FIGS. 10 and 11, with mask $b_0$ recursively removed from the source instances 28, 30, 32 and 34, edges 47, 48 and 49 have edge labels 662, 262 and 162, respectively, corresponding thereto. The process proceeds to remove the CAOE mask $b_2$ from destination instances 29, 31, 33 and 35 in a similar way, resulting in edge labels 262 corresponding to edges 56 and 57; edge label 762 corresponding to edge 58; and edge label 862 corresponding to edge 59. From the current example, the fan-in of destination instance 35 is checked for the existence of masks $b_2$ and $b_1$ only (as the presence of these two masks implies the edge is marked or was marked by mask $b_0$ prior to the recursive removal from source instances 28, 30, 32 and 34). Mask $b_2$ is removed from edge 59 and recursive removal of dangling masks proceeds to edge 55. Here when checking the fan-out of node instance 46, edge 58 is discovered to be marked by mask $b_2$ indicating that a path exists through edge 55 by way of edge 58 from the destination instance 33.

Referring to FIG. 11, the resulting mapping of the timing graph after the timing conflicts have been resolved and each source and destination instance pair has only a single mask that exists on all edges therebetween. In this figure, the HPC (mask $b_1$) corresponding to bit $b_1$ is on all of the edges of the original masking. Alternatively, the LPC (mask $b_0$) was in conflict with mask $b_1$ and was duplicated the resulting CAOE mask $b_2$. The path that was overwritten on the path from source instance 28 to destination instance 35 is no longer associated with the timing exception associated with mask $b_0$ or $b_2$, but the remaining endpoint relationships defined by timing exception (3) remain as represented by mask $b_0$ from source instance 32 to destination instances 33 and 35; and mask $b_2$ from source instance 28 to destination instance 33. The conflict priority assigned to each of the timing requirements may be chosen arbitrarily. In the present example, the priority is determined by the position of the set of timing exceptions 67 in exceptions list 23 so that priority is given to later entered set of timing exceptions, shown in FIG. 1.

Referring again to both FIGS. 1 and 2, in another embodiment of the present invention, the computational resources required to determine conflicts on timing graph 24 may be reduced by merging signal propagation criteria. In this manner, it is not necessary to define a clock domain for each of the timing requirements associated with two different signal propagation criteria. Rather, a single timing requirement is assigned to two or more signal propagation criteria. This typically occurs when multiple sets of timing exceptions 67 represent timing requirements having either identical source instances or destination instances. This allows merging the signal propagation criteria to be represented by a merged set of timing exceptions 67. As a result, a set of timing exceptions 67 would include information concerning the two different signal propagation criteria. It should also be understood that a merged timing requirement may be generated for two signal propagation criteria in which one of the signal propagation criteria is a subset of the remaining signal propagation criteria.

In yet another embodiment of the present invention, it is possible to associate a mask with edges of a through a node instance that lies between the set of source instance and the set of destination instances. This mask is referred to as a through mask. The path can be specified by creating the through mask that is propagated in both directions from the node instance, referred to as a through node. This through mask is then combined using a bitwise AND with the result of the source and destination mask combination to produce a path that originates at a source instance traversed through a specified node instance and ends at a destination instance. To resolve conflicts with a mask that has a set of through nodes specified, an additional edge mask is propagated from the source instance of the LPC using the CAOE mask as a guide to restrict the traversal. This duplicate mask is then removed recursively from the through nodes using the same removal technique described previously. This mask represents all paths of the conflicting mask that are not through the intermediate node. The algorithm then continues with the conflicting mask being resolved using the process described above.

Benefits of the invention are manifold in that each of the timing exception domains represented by one of bits $b_0$-$b_{31}$ in an edge label 62 facilitates pruning entries 66 in netlist 22 while minimizing the amount of edges that must be analyzed. Furthermore, it is easy to determine a portion of a timing graph, referred to as a sub-graph, that is no longer applicable to a given clock domain. For example, during the DFS traversals for each clock domain during slack computation, the clock domain bit masks can be used to prevent traversal through edges outside of the current clock domain. When all the sub-graphs (original and duplicates) of a given exception die, then the exception becomes ignored, at which point we can inform the user the exception no longer applies.

The present invention has been described herein with reference to particular embodiments thereof, modification, changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method for clock domain conflict analysis, said method comprising:
   generating, using a computer, a timing graph having a source instance, a destination instance and a plurality of edges defining a plurality of signal paths between said source instance and destination instance;
   mapping a plurality of clock domains to said timing graph, with a subset of said plurality of edges being associated with more than one clock domain and with one of said plurality of paths;
   identifying from said subset, conflicting clock domains associated with a common edge; and
   dissociating one of said conflicting clock domains from one of the edges of said subset by removing edge masks associated with the clock domain for the edge in response to identification of conflicting clock domains, the dissociation resulting in the source and destination instances being uniquely related by a single timing exception thereby resolving clock domain conflict.

2. The method as recited in claim 1 wherein dissociating further includes dissociating one of said clock domains from said one of said plurality of paths while maintaining mapping between said plurality of clock domains and edges of said plurality of edges outside of said subset.

3. The method as recited in claim 2 wherein dissociating further includes mapping an additional clock domain to the edges of said subset, with said additional clock domain being identical to one of said clock domains and dissociating an additional edge of said subset from said additional clock domain, with said additional edge differing from said one of the edges.

4. The method as recited in claim 1 wherein mapping further includes performing multiple depth first searches in opposing directions over said timing graph for a timing requirement to define one of said plurality of clock domains.

5. The method as recited in claim 1 further includes generating a source mapping having a first edge mask associated therewith and generating a destination mapping having a second edge mask associated therewith and performing a bit-wise AND on data contained in said fist and second edge masks to generate one of said plurality of clock domains.

6. The method as recited in claim 1 wherein mapping further includes mapping said plurality of edges with corresponding edge masks representing a timing requirement.

7. The method as recited in claim 1 wherein mapping further includes representing said plurality of clock domains with an identifier containing binary bit data, with identifying further including performing a logical OR operation employing binary bit data contained in identifiers associated with said plurality of clock domains.

8. The method as recited in claim 1 wherein generating further includes generating said timing graph to have a plurality of nodes, a plurality of source instances and a plurality of destination instances, with said plurality of signal paths extending between said plurality of source instances and said plurality of destination instances through said plurality of nodes.

9. The method as recited in claim 8 further including obtaining a plurality of signal propagation criteria each of which includes timing requirement information, source information and destination information and augmenting a sub group of said plurality of signal propagation requirements by including additional information therewith selected from a set of information consisting essentially of said source information and said destination information to produce a merged timing requirement.

10. A computer system for clock domain conflict analysis, said system comprising:
    a processor;
    a memory in data communication with said process, said memory including,
       a first set of computer-readable instructions to generate a timing graph having a source instance, a destination instance and a plurality of edges defining a plurality of signal paths between said source instance and said destination instance,
       a second set of computer-readable instructions to map a plurality of clock domains to said timing graph, with a subset of said plurality of edges being associated with more than one clock domain and with one of said plurality of paths,
       a third set of computer-readable instructions to identify, from said subset, a conflict, said conflict including clock domains associated with a common edge and having differing timing requirements; and
       a fourth set of computer-readable instructions to dissociate one of said clock domains from one of the edges of said subset having said conflict by removing edge masks associated with the clock domain for the edge in response to identification of a conflict, the dissociation resulting in the source and the destination instances being uniquely related by a single timing exception thereby resolving clock domain conflict.

11. The system as recited in claim 10 wherein said fourth set of computer-readable instructions further include a sub-routine to dissociate one of said clock domains from said one of said plurality of paths while maintaining mapping between said plurality of clock domains and edges of said plurality of edges outside of said subset.

12. The system as recited in claim 10 wherein said fourth set of computer-readable instructions further includes a sub-routine to map an additional clock domain to the edges of said subset, with said additional clock domain being identical to one of said clock domains and dissociating an additional edge of said subset from said additional clock domain, with said additional edge differing from said one of the edges.

13. The system as recited in claim 10 wherein said second set of computer-readable instructions further includes a sub-routine to perform multiple depth first searches in opposing directions over said timing graph to define one of said plurality of clock domains.

14. The system as recited in claim 10 further including a fifth set of computer-readable instructions to generate a source mapping having a first edge mask associated therewith and a sixth set of computer-readable instructions to generate a destination mapping having a second edge mask associated therewith and a seventh set of computer-readable instructions to perform a bit-wise AND on data contained in said fist and second edge masks to generate one of said plurality of clock domains.

15. The system as recited in claim 10 wherein said second set of computer-readable instructions further includes a sub-routine to map said plurality of edges with corresponding edge masks representing timing requirements associated with one of said plurality of clock domains.

16. The system as recited in claim 10 wherein said second set of computer-readable instructions further includes a sub-routine to represent said plurality of clock domains with an identifier containing binary bit data, with identifying further including performing a logical OR operation employing binary bit data contained in identifiers associated with said plurality of clock domains.

17. The system as recited in claim 10 wherein said first set of computer-readable instructions includes a sub-routine to generate said timing graph to have a plurality of nodes, a plurality of source instances and a plurality of destination instances, with said plurality of signal paths extending between said plurality of source instances and said plurality of destination instances through said plurality of nodes.

18. The system as recited in claim 17 further including a eighth set of computer-readable instructions to obtain a plurality of signal propagation criteria each of which includes timing requirement information, source information and destination information and a ninth set of computer-readable instructions to augment a sub group of said plurality of signal propagation criteria by including additional information therewith selected from a set of information consisting essentially of said source information and said destination information to produce a merged timing requirement.

19. A computer-readable medium including computer-readable instructions, which when executed by a computer, are for performing clock domain analysis, said computer-readable medium comprising:
  code to generate a timing graph having a source instance, a destination instance and a plurality of edges defining a plurality of signal paths between said source instance and said destination instance;
  code to map a plurality of clock domains to said timing graph, with a subset of said plurality of edges being associated with more than one clock domain and with one of said plurality of paths;
  code to identify, from said subset, a conflict, said conflict including clock domains associated with a common edge and having differing timing requirements; and
  code to dissociate one of said clock domains from one of the edges of said subset having said conflict by removing edge masks associated with the clock domain for the edge in response to identification of a conflict, the dissociation resulting in the source and destination instances being uniquely related by a single timing exception thereby resolving clock domain conflict.

20. The computer-readable medium as recited in claim 19 wherein said code to dissociate further includes code to dissociate one of said clock domains from said one of said plurality of paths while maintaining mapping between said plurality of clocks domains and edges of said plurality of edges outside of said subset.

21. The computer-readable medium as recited in claim 19 wherein said code to dissociate further includes code to map an additional clock domain to the edges of said subset, with said additional clock domain being identical to one of said clock domains and dissociating an additional edge of said subset from said additional clock domain, with said additional edge differing from said one of the edges.

22. The computer-readable medium as recited in claim 19 wherein said code to map further includes code to perform multiple depth first searches in opposing directions over said timing graph for a timing requirement to define one of said plurality of clock domains.

23. The computer-readable medium as recited in claim 19 further including code to generate a source mapping having first edge masks associated therewith, code to generate a destination mapping having second edge masks associated therewith and code to perform a bit-wise AND on data contained in said fist and second edge masks to generate one of said plurality of clock domains.

24. The computer-readable medium as recited in claim 19 wherein code to map further includes code to map said plurality of edges with corresponding edge masks representing a timing requirement associated with one of said plurality of clock domains.

25. The computer-readable medium as recited in claim 19 wherein said code to map further includes code to associate said plurality of clock domains with an identifier containing binary bit data, with identifying further including performing a logical OR operation employing binary bit data contained in identifiers associated with said plurality of clock domains.

26. The computer-readable medium as recited in claim 19 wherein said code to generate further includes code to generate said timing graph to have a plurality of nodes, a plurality of source instances and a plurality of destination instances, with said plurality of signal paths extending between said plurality of source instances and destination instances through said plurality of nodes.

27. The computer-readable medium as recited in claim 26 further including code to obtain a plurality of signal propagation criteria, each of which includes timing requirement information, source information and destination information and code to augment a sub group of said plurality of signal propagation criteria by including additional information therewith selected from a set of information consisting essentially of said source information and said destination information to produce a merged timing requirement.

* * * * *